United States Patent
Aaron et al.

(10) Patent No.: US 9,015,599 B2
(45) Date of Patent: Apr. 21, 2015

(54) DEVICES, METHODS AND COMPUTER-READABLE MEDIA FOR PROVIDING CONTROL OF SWITCHING BETWEEN MEDIA PRESENTATION SCREENS

(75) Inventors: Jeffrey Aaron, Atlanta, GA (US); Robert Streijl, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 773 days.

(21) Appl. No.: 12/253,003

(22) Filed: Oct. 16, 2008

(65) Prior Publication Data

US 2010/0100822 A1    Apr. 22, 2010

(51) Int. Cl.
*G06F 3/00*    (2006.01)
*H04L 12/00*    (2006.01)
*G06F 3/0487*    (2013.01)
*H04L 12/66*    (2006.01)

(52) U.S. Cl.
CPC .............. *H04L 12/66* (2013.01); *G06F 3/0487* (2013.01)

(58) Field of Classification Search
CPC .......... H04N 7/17318; H04N 21/4622; H04N 21/4627; G06F 17/30867; G06F 9/4443; G06F 3/0481; G06F 3/0484; G06F 3/0487
USPC .......... 715/730, 745, 718, 733, 746; 709/203; 348/445, 455; 725/10; 340/825.22, 340/825.69, 825.29; 370/396; 455/456.1
See application file for complete search history.

(56) References Cited

U.S. PATENT DOCUMENTS

| | | | |
|---|---|---|---|
| 6,272,545 B1 | 8/2001 | Flanigan et al. | |
| 6,553,232 B1 | 4/2003 | Shaffer et al. | |
| 6,826,150 B1 | 11/2004 | Bhattacharya et al. | |
| 6,947,750 B2 | 9/2005 | Kakani et al. | |
| 7,630,986 B1 | 12/2009 | Herz et al. | |
| 7,665,024 B1 * | 2/2010 | Kondziela | 715/745 |
| 7,769,806 B2 * | 8/2010 | Van Wie et al. | 709/203 |
| 7,788,398 B2 * | 8/2010 | Chapweske et al. | 709/233 |
| 7,796,190 B2 * | 9/2010 | Basso et al. | 348/445 |
| 7,899,793 B2 | 3/2011 | Mimatsu | |
| 7,904,360 B2 | 3/2011 | Evans | |
| 7,958,530 B2 * | 6/2011 | Fukuda et al. | 725/62 |
| 7,969,990 B2 * | 6/2011 | Shmueli et al. | 370/396 |
| 7,975,062 B2 * | 7/2011 | Krikorian et al. | 709/231 |
| 8,006,290 B2 | 8/2011 | Agrawal et al. | |
| 8,036,646 B1 * | 10/2011 | Delker et al. | 455/414.2 |
| 8,185,489 B2 | 5/2012 | Aaron | |
| 8,332,402 B2 * | 12/2012 | Forstall et al. | 707/736 |
| 8,774,825 B2 * | 7/2014 | Forstall et al. | 455/456.1 |
| 2003/0154242 A1 * | 8/2003 | Hayes et al. | 709/203 |
| 2004/0042489 A1 | 3/2004 | Messick et al. | |
| 2004/0117839 A1 * | 6/2004 | Watson et al. | 725/87 |
| 2004/0161082 A1 * | 8/2004 | Brown et al. | 379/93.21 |

(Continued)

OTHER PUBLICATIONS

U.S. Appl. No. 13/495,920, filed Jun. 13, 2013, Aaron et al.

*Primary Examiner* — James T Durkin
(74) *Attorney, Agent, or Firm* — Baker & Hostetler LLP

(57) ABSTRACT

Devices, methods and computer-readable media for providing control of switching of an interactive session in a communications network. Content may be switched between media presentation screens. Collected data is analyzed and a location of a user within the communications network is monitored. A presentation of a first screen the user is watching may be exchanged for a presentation of a second screen selected based upon a change in the location of a monitored user and the analysis of the collected data.

16 Claims, 11 Drawing Sheets

(56) References Cited

U.S. PATENT DOCUMENTS

| | | |
|---|---|---|
| 2004/0253940 A1 | 12/2004 | Andrews et al. |
| 2005/0157660 A1 | 7/2005 | Mandato et al. |
| 2006/0020646 A1 | 1/2006 | Tee et al. |
| 2006/0025149 A1 | 2/2006 | Karaoguz et al. |
| 2006/0092037 A1* | 5/2006 | Neogi et al. ............. 340/825.22 |
| 2007/0032345 A1* | 2/2007 | Padmanabhan et al. .......... 482/8 |
| 2007/0050492 A1 | 3/2007 | Jorgensen |
| 2007/0133428 A1 | 6/2007 | Taylor et al. |
| 2007/0198682 A1* | 8/2007 | Pazhyannur et al. ......... 709/223 |
| 2007/0202923 A1* | 8/2007 | Jung et al. .................... 455/566 |
| 2008/0008188 A1* | 1/2008 | Buga et al. ............... 370/395.21 |
| 2008/0216125 A1* | 9/2008 | Li et al. ........................... 725/62 |
| 2008/0240444 A1* | 10/2008 | Shuster ......................... 380/277 |
| 2009/0005071 A1* | 1/2009 | Forstall et al. ............ 455/456.1 |
| 2009/0328087 A1* | 12/2009 | Higgins et al. .................. 725/10 |
| 2010/0005483 A1* | 1/2010 | Rao ................................ 725/25 |
| 2010/0082567 A1* | 4/2010 | Rosenblatt et al. ........... 707/705 |
| 2010/0099388 A1 | 4/2010 | Aaron et al. |
| 2010/0099392 A1 | 4/2010 | Aaron et al. |
| 2010/0100519 A1 | 4/2010 | Aaron et al. |
| 2010/0100613 A1 | 4/2010 | Aaron et al. |
| 2010/0146527 A1* | 6/2010 | Craib et al. ....................... 725/5 |

* cited by examiner

DEVICES, METHODS AND COMPUTER-READABLE MEDIA FOR PROVIDING CONTROL OF SWITCHING BETWEEN MEDIA PRESENTATION SCREENS

CROSS-REFERENCE TO RELATED APPLICATIONS

This application is related to the following co-pending and commonly-assigned patent applications, which are hereby incorporated herein by reference in its respective entirety:

"DEVICES, METHODS, AND COMPUTER-READABLE MEDIA FOR PROVIDING CALENDAR-BASED COMMUNICATION SYSTEM SERVICES" to Jeffrey Aaron, et al., having U.S. patent application Ser. No. 12/253,137, filed Oct. 16, 2008.

"DEVICES, METHODS, AND COMPUTER-READABLE MEDIA FOR PROVIDING SERVICES BASED UPON IDENTIFICATION OF DECISION MAKERS AND OWNERS ASSOCIATED WITH COMMUNICATION SERVICES" to Jeffrey Aaron, et al., having U.S. patent application Ser. No. 12/253,157, filed Oct. 16, 2008.

"DEVICES, METHODS, AND COMPUTER-READABLE MEDIA FOR PROVIDING BROAD QUALITY OF SERVICE OPTIMIZATION USING POLICY-BASED SELECTIVE QUALITY DEGRADATION" to Jeffrey Aaron, et al., having U.S. patent application Ser. No. 12/253,178, filed Oct. 16, 2008.

"DEVICES, METHODS, AND COMPUTER-READABLE MEDIA FOR PROVIDING QUALITY OF SERVICE OPTIMIZATION VIA POLICY-BASED REARRANGEMENTS" to Jeffrey Aaron, et al., having U.S. patent application Ser. No. 12/253,197, filed Oct. 16, 2008.

BACKGROUND

The present invention relates to systems, methods, and computer-readable media for controlling the presentation of media content to a user. More particularly, the present invention relates to devices, methods and computer-readable media for providing control of switching a presentation of content and/or an interactive session between media presentation screens and/or interactive terminals.

Traditionally, televisions signals have been provided via a single wire cable or terrestrial antenna. In contrast, the telephone has traditionally used twisted-pair copper wires to provide telephone service. Access to the Internet has been provided by either twisted-pair copper wires or via a single wire cable. Recently, both cable operators and telecommunication companies have begun to offer all three services, television, telephone and Internet, on one wire. Significant cost savings and/or other advantages are provided by combining all three services on a single wire.

Wireless cell phone technology is a fourth type of service that offers the convenience of keeping in contact with others at any place and at any time. Cell phones may connect wirelessly with a cell phone network to offer data and communication services. Cell phones often combine communication, digital photography, video game functions, video and audio-video viewing functions, etc. To take advantage of this added functionality, hybrid cell phones that combine short-range (WiFi), high-speed Internet access and cellular service have been marketed to allow users to make connections using a local wireless Internet access point and seamlessly switch over to a cell phone network whenever necessary. Moreover, cellular carriers have spent billions of dollars to upgrade their systems for high-speed data. The upgraded networks offer wide coverage that exceeds Wi-Fi's short range. However, wireless LAN (local area network) technology still provides a higher bandwidth than cellular high-speed data networks. Accordingly, the ability to seamlessly switch between the different technology networks enables users to more efficiently use high-speed networks.

In view of the popularity of the above type of services, communication service providers covet the eyes and ears of consumers, which today are focused on three screens, i.e., the television, the personal computer and wireless devices such as cell phones integrated with the above listed functionality. One aspect that is common to the delivery of content to the three screens is the Internet Protocol (IP). Moreover, an IP-based platform also allows significant opportunities to make the consumer's experience more interactive and personalized. For example, television viewers may want to retrieve a player's statistics while watching a sports game, to access photos or music from their PC on their television or use a wireless phone to schedule a recording of their favorite show.

However, a problem presented by the three screens vision involves determining when to switch the presentation of an application or service from one of the three types of devices or screens to another. For example, if a user wants to switch from viewing a movie television program on a smartphone or personal computer to viewing the movie on a home television, the user has to turn on the television, select the proper channel, set the volume, and then turn off the former viewing source. There may also be additional parameters the user must consider, e.g., whether the television in the media room is available. Other scenarios may provide additional or greater difficulties, or make the transition disruptive to the user.

It can be seen then that there is a need for devices, methods, and computer-readable media that provides control of switching between media presentation screens, including any associated interactive communication sessions.

SUMMARY

According to exemplary embodiments, methods, computer-readable media, and devices provide control for the switching a presentation of media content on one device to another device, including likewise switching of any associated sessions used for interactivity, control, communication, and/or other relevant purposes.

According to one embodiment, a controller is provided for analyzing the collected data and monitoring locations of a user within the communications network. The controller exchanges a presentation of a first screen the user is watching for a presentation of a second screen selected based upon a change in the location of a monitored user and the analysis of the collected data.

These and other features and advantages, which characterize the present invention, will be apparent from a reading of the following detailed description and a review of the associated drawings. It is to be understood that both foregoing general description and the following detailed description are exemplary and explanatory only and are not restrictive of the invention, as claimed.

DETAILED DESCRIPTION

In the following description of the exemplary embodiments reference is made to the accompanying drawings that form a part hereof, and in which is shown by way of illustration the specific embodiments in which the invention may be practiced. It is to be understood that other embodiments may be equally applicable to controlling the switching of a presentation of content between media presentation screens.

Figure 1:
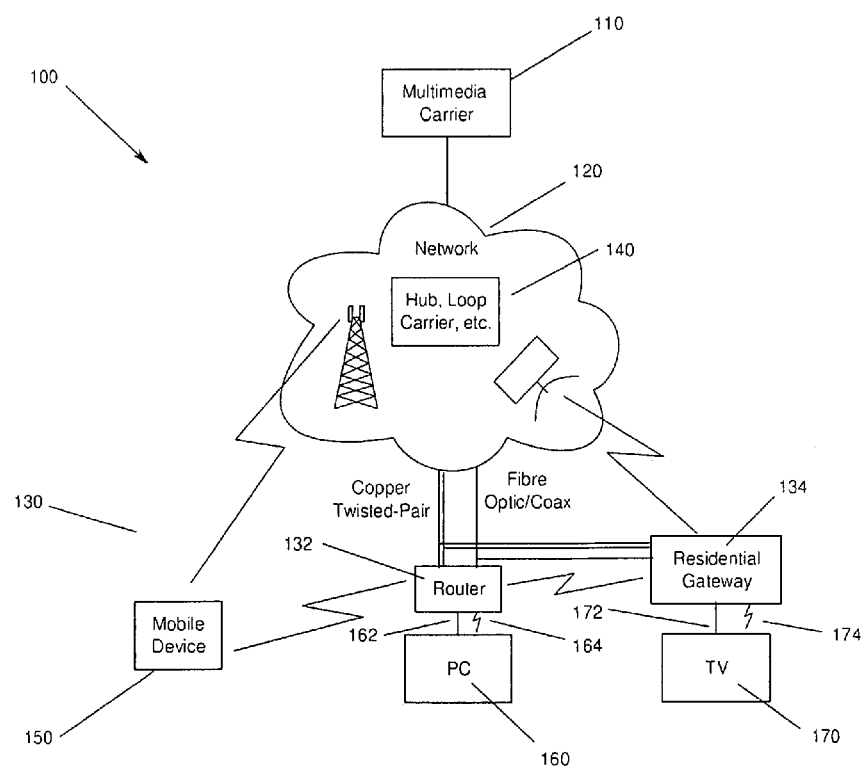
FIG. 1 illustrates a general block diagram of a media and communication network according to an exemplary embodiment.

FIG. 1 illustrates a general block diagram 100 of a media and communication network according to an exemplary embodiment. A multimedia carrier 110 is configured to provide hardware and software infrastructure for the delivery of content and for providing communication channels for subscribers or other users. Examples of communication channels includes telephone services, Internet access, voice-over-IP, interactive television and gaming, etc. The multimedia carrier 110 acquires programming from content providers and encodes the content. The multimedia carrier 110 may also add local programming and provide additional digital services such as video on demand, and storage for content according to user directions.

The multimedia carrier 110 is coupled to a network 120 for distributing the content, providing Internet access, telephone services, etc. The network 120 provides the intermediate infrastructure between the point-of-delivery 130 and the multimedia carrier 110. The network 120 may be configured to provide one or more or the intermediate infrastructure 140 for television content delivery, plain-old-telephone system, satellite television, Internet services, wireless communications, such as cellular mobile phone services, etc. Accordingly, the network may include hub offices, IP service offices, local loop carrier facilities, satellite carrier facilities, communication satellites, telecom point-of-presence, mobile switching centers, base stations, and distribution nodes.

At the point-of-delivery 130, a router 132 may be used to provide digital services, such as Internet access. A computer or other Internet-capable device 160 may be coupled to the router 132 by a network cable 162 or wirelessly 164. A residential gateway 134 may be used to provide content, e.g., IPTV, to multimedia-capable viewing devices, such as a television, via a cable 172 or wirelessly 174. A mobile device 150 operates within a mobile operating system. Examples of such mobile devices 150 may include cell phones, smart phones, handheld computers, personal digital assistants, etc.

In addition, mobile devices 150 may be configured to use location-based services (LBS) to receive information specific to a location. Some examples of location-based services include requesting the nearest business or service, such as an ATM or restaurant, and finding a friend. A service provider may obtain the location of a mobile device from a global positioning system (GPS) circuit built into the device, or by using radiolocation and trilateration based on the signal-strength of the closest cell-phone towers (for phones without GPS features). Any other suitable means of obtaining or estimating location may also be used.

Figure 2:
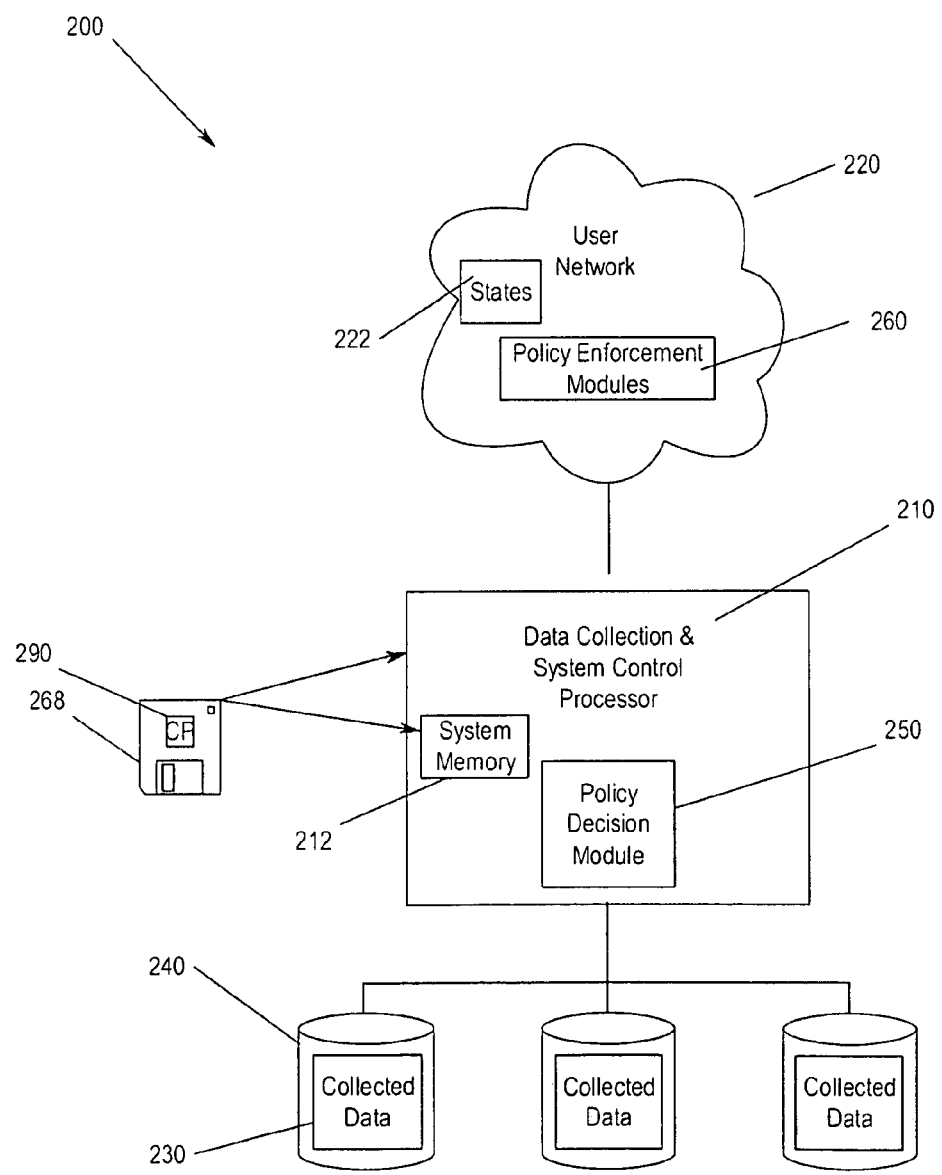
FIG. 2 illustrates a system for collecting and controlling the user experience of services according to an exemplary embodiment.

FIG. 2 illustrates a system 200, according to an exemplary embodiment, for collecting and controlling the user experience of services, e.g., through an infrastructure as described above. The system operator may provide a processor 210 that collects and controls the system based upon the data 230 collected from the user. The data collection and system control processor 210 gathers information from across the network of users 220. The collected data 230 is stored in a database 240 or other suitable means of storage (e.g. flash memory). The data 230 in the database 240 may be analyzed for further determination of the type of control that is to be provided. Alternatively, or in addition to, the data 230 may represent choices or parameters identified by the user and provided as input to the data collection and system control processor 210. Moreover, data for making decisions may be derived from any point in the network 220. For example, data can be collected from applications, services, servers, network routers, etc. The data may also be automatically collected, collected in response to queries made to a user, or collected via un-prompted feedback from a user. The data collection and system control processor 210 uses the collected data 230 to control access and the delivery of content to the network of users 220. Accordingly, the data collection and system control processor 210 may be configured to manage a switching of an interactive session in a communications network. The control processor 210 may also be configured to switch between the presentation of an application or service from one of multiple devices/screens to another, for instance between three screens such as a television, a computer, and a mobile device.

As shown in FIG. 2, the data collection and system control processor 210 includes a policy decision module 250 that makes decisions based on the collected data 230 obtained from the network 220. Based upon the collected data 230, the data collection and system control processor 210 may identify different system states 222, such as the state of the network, various states of network-related equipment such as routers and firewalls, various states of service-related equipment such servers, the state of a service provided to a user, even the state of a customer, or other more fine-grained managed object states. Then, an appropriate action may be taken. Once that decision is made it is communicated to policy enforcement functions 260 that can be distributed anywhere within the network. Accordingly, within a communications network, different screens, e.g., display device, may be used by a user to enjoy content provided over the communications network. For example, mobile devices such as personal digital assistants (PDAs), smart phones, mobile computers, etc. may be used to access content while a user is mobile. In contrast, at the office or at home, a user is more likely to access content via personal computers, large flat-panel televisions, projection systems, etc. Policy decision module 250 may be configured to cause the different screens to work cooperatively to allow switching between screens based upon parameters such as the user's locations, preferences, and other parameters. In general, such decisions may be arrived at via a suitable set of rules, algorithms, threshold checks, etc. as for instance may be embodied via software or hardware or some combination thereof.

FIG. 2 shows one exemplary embodiment. However, other embodiments may take the form of an entirely software embodiment or an embodiment containing both hardware and software elements. Exemplary embodiments may be implemented in software that includes, but is not limited to, firmware, resident software, microcode, etc. Furthermore, exemplary embodiments may take the form of a computer program product 290 accessible from a computer-usable or computer-readable medium 268 providing program code for use by or in connection with a computer or any instruction execution system.

For the purposes of this description, a computer-usable or computer readable medium 268 can be any apparatus that can contain, store, communicate, propagate, or transport the program for use by or in connection with the instruction execution system, apparatus, or device. The medium 268 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code for providing data collection and system control according to an exemplary embodiment may include at least one processor 210 coupled directly or indirectly to memory elements 212. The memory elements 212 can include local memory employed during actual execution of the program code, bulk storage, and cache memories which provide temporary storage of at least some program code in order to reduce the number of times code must be retrieved from bulk storage during execution.

Accordingly, the computer program 290 comprise instructions which, when read and executed by the system 200 of FIG. 2, causes the processor 210 to perform the steps necessary to execute the steps or elements of exemplary embodiments.

Moreover, the functionality associated with the processor for providing data collection and system control 210 may be centralized or partially to fully distributed and included in any piece of equipment or any portion of software in the system 200. Accordingly, the data collection and control framework may be distributed across the system 200. Further, the data collection and control framework is configured as an overlay over the system infrastructure to offer any service to any user on any screen, and to be able to switch from one screen to the other. Still further, the control process may be automated, semi-automated, or manual.

Figure 3:
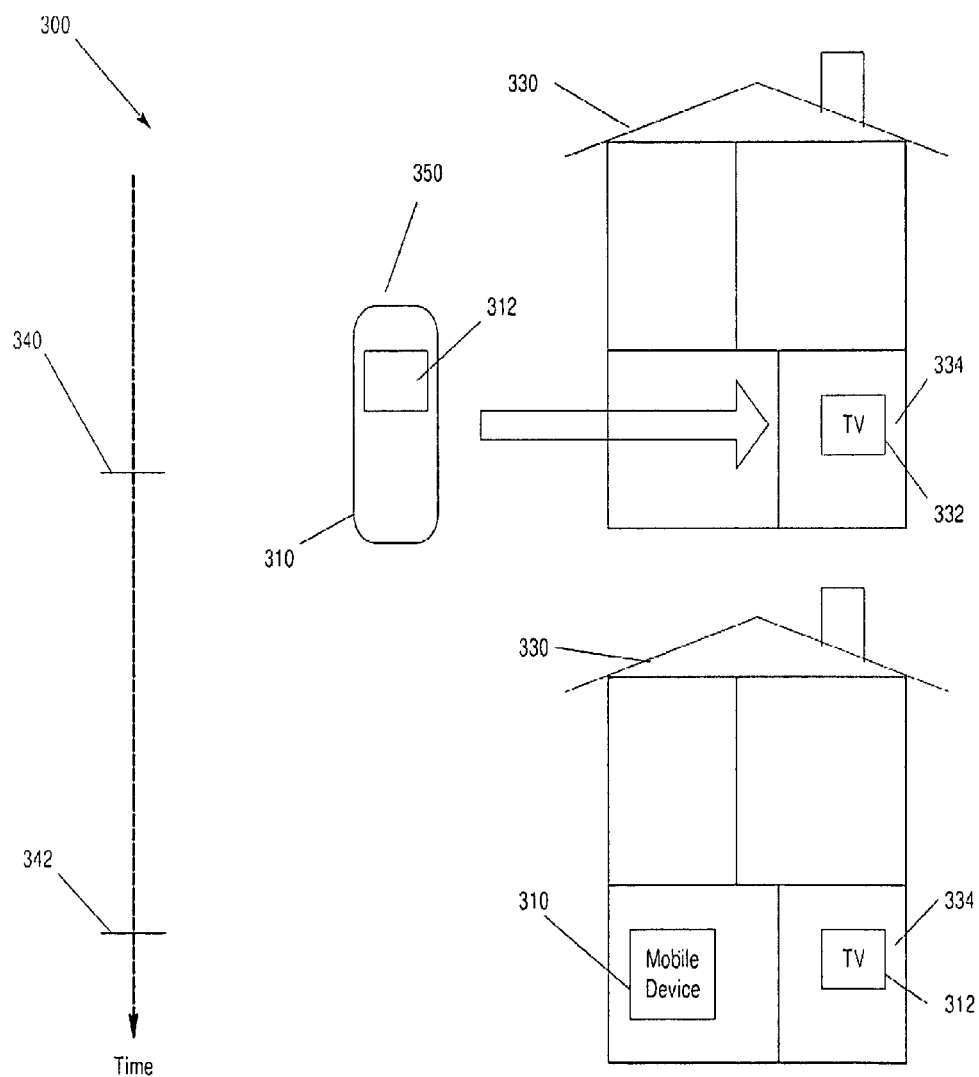
FIG. 3 illustrates an example of a screen switch according to an exemplary embodiment.

FIG. 3 illustrates an example of a screen switch 300 according to an exemplary embodiment. In FIG. 3, a user of a mobile device 310 is shown at a location 350 away from, e.g., home 330. This position 350 is designated to be at time T1 340. The mobile device 310 of the user is showing displaying a first show 312, e.g., as illustrated by the hot-air balloons on the mobile device 310. At home 330, the family may be watching a travel show 332, as represented by a beach scene on the home television 334. At time T2 342, the user has arrived home as represented by the mobile device 310 positioned within the home 330. Using parameters set earlier, queries presented to the user when the user arrives at home, system default parameters or other criteria, various decisions are made by the user's service provider.

A key parameter for determining whether to make a screen switch may be based on at least the new location of the user and the state of the mobile device 310 and the home television 334. In response to the decisions, the home television 334 is switched to the show 312 the user was watching on the mobile device 310 without the user missing any part of the show 312. The mobile device 310 may then be turned off. Network connections supplying the show 312 are controlled accordingly so as to support the switch from one screen to another, for instance to accomplish the re-routing of pertinent communications including signaling and data connections. Service-related aspects are likewise controlled.

Though a home is described and illustrated in FIG. 3 for illustrative purposes, it should be appreciated that embodiments are not limited to applications associated with a home or residence but may also include applications within other types of environments, e.g., an office.

Figure 4:
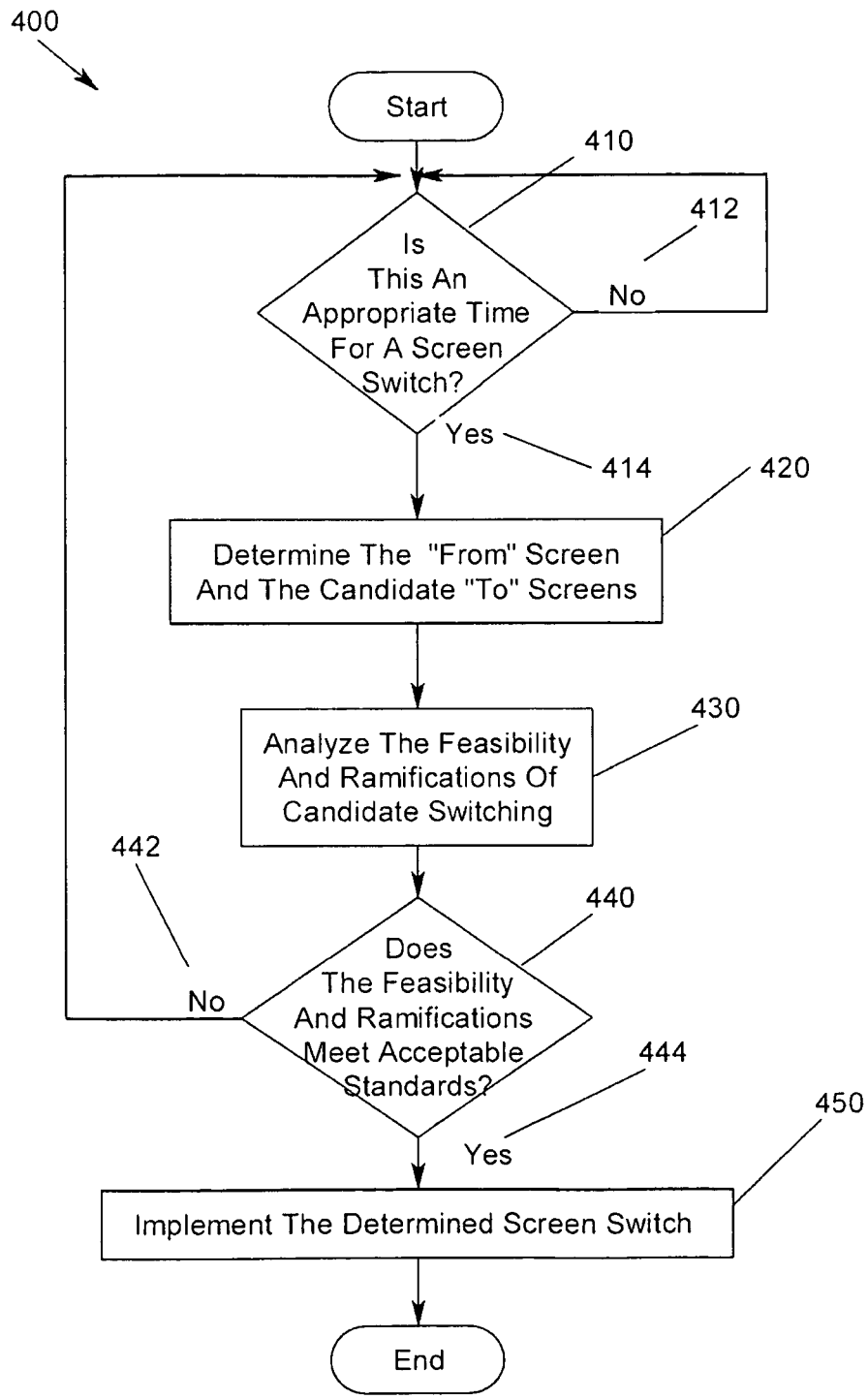
FIG. 4 is a flow chart illustrating the control of switching a presentation of content between media presentation screens according to an exemplary embodiment.

FIG. 4 is a flow chart 400 illustrating the processor controlled switching of a presentation of content between media presentation screens according to an exemplary embodiment. First, a determination is made whether the timing of a screen switching is appropriate 410. Determining when switching is appropriate can be done at least in part via location measurement, e.g. detecting when the user's cell phone moves away from or back to the user's home, office, etc. If the time is not appropriate for a screen switch 412, the process returns to the start. If the time is appropriate for a screen switch 414, the system determines the "from" screen and candidate "to" screens 420. The feasibility and ramifications of candidate switching is analyzed 430. A determination is made whether the feasibility and ramifications meet acceptable standards 440. When the feasibility and ramifications meet acceptable standards 444, the determined screen switch is implemented 450. Otherwise 442, the process returns to the start.

The determination of the steps 420, 430, 440, 450 subsequent to determining when switching is appropriate 410 may be based upon information regarding the current active service, other active services which may be impacted including active services of other users, profiles and usage histories of the switching user and other relevant users, network capacity and utilization, and various policy rules, algorithms, parameters, heuristics, timers, and thresholds. Policy rules can be modified by the user, network provider and/or service provider so as to properly take preferences, needs, limitation, and contingencies regarding all parties into account. The impact that a switch will have on other users may also be considered.

Figure 5:
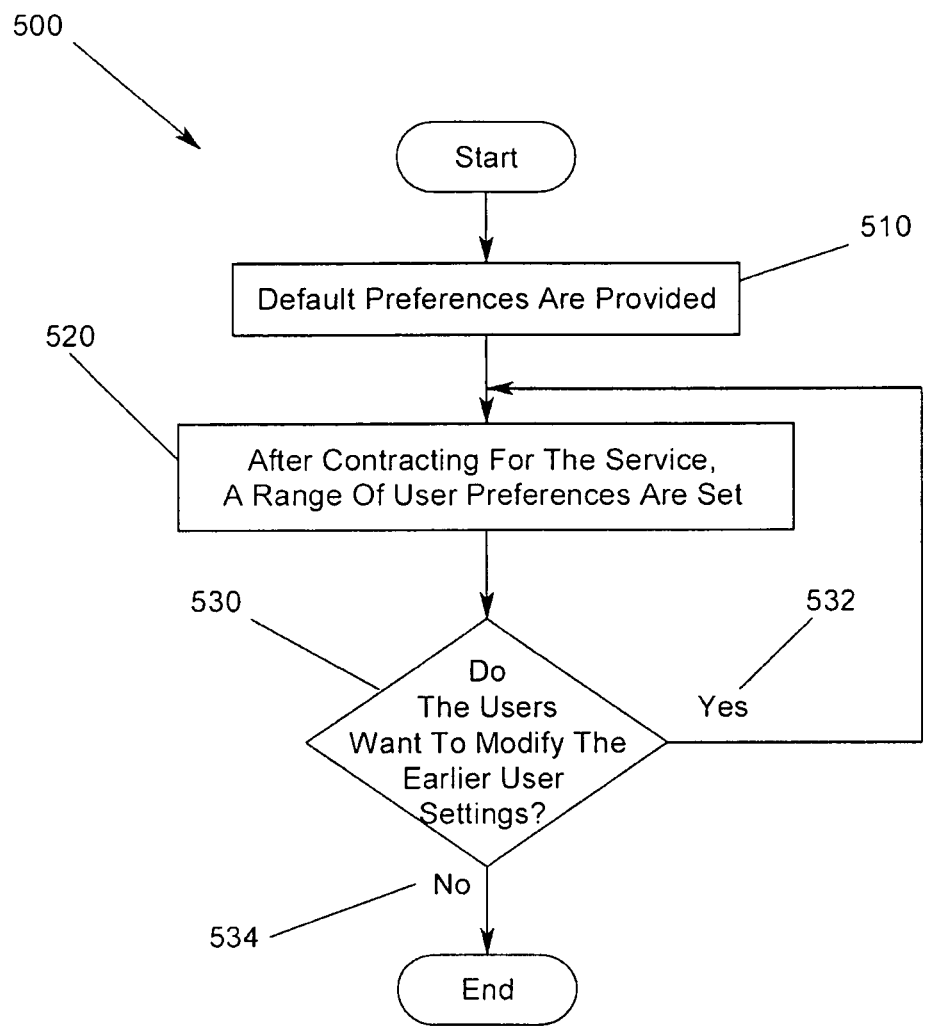
FIG. 5 is a flow chart illustrating collection of initial data for controlling the switching a presentation of content between media presentation screens according to an exemplary embodiment.

FIG. 5 is a flow chart 500 illustrating collection of initial data for processor controlled switching of a presentation of content between media presentation screens according to an exemplary embodiment. Default preferences are provided and may be used when the user settings do not provide an override of the default preferences 510. Multiple default sets may be used, wherein such default sets may correspond to predetermined user profiles. A range of user preferences may be set when a user contracts for the service 520. Whether the users want to modify the initial settings, e.g., via web site, are determined 530. Preferences may include whether to switch, in what circumstances, at what locations, at what times/days, other users in a group, family or team and their priorities, priorities of various usage types, programs and applications, etc. If the user wants to modify the settings 532, the process returns to allow such modifications. Otherwise 534, this portion of the process 500 is completed.

Figure 6:
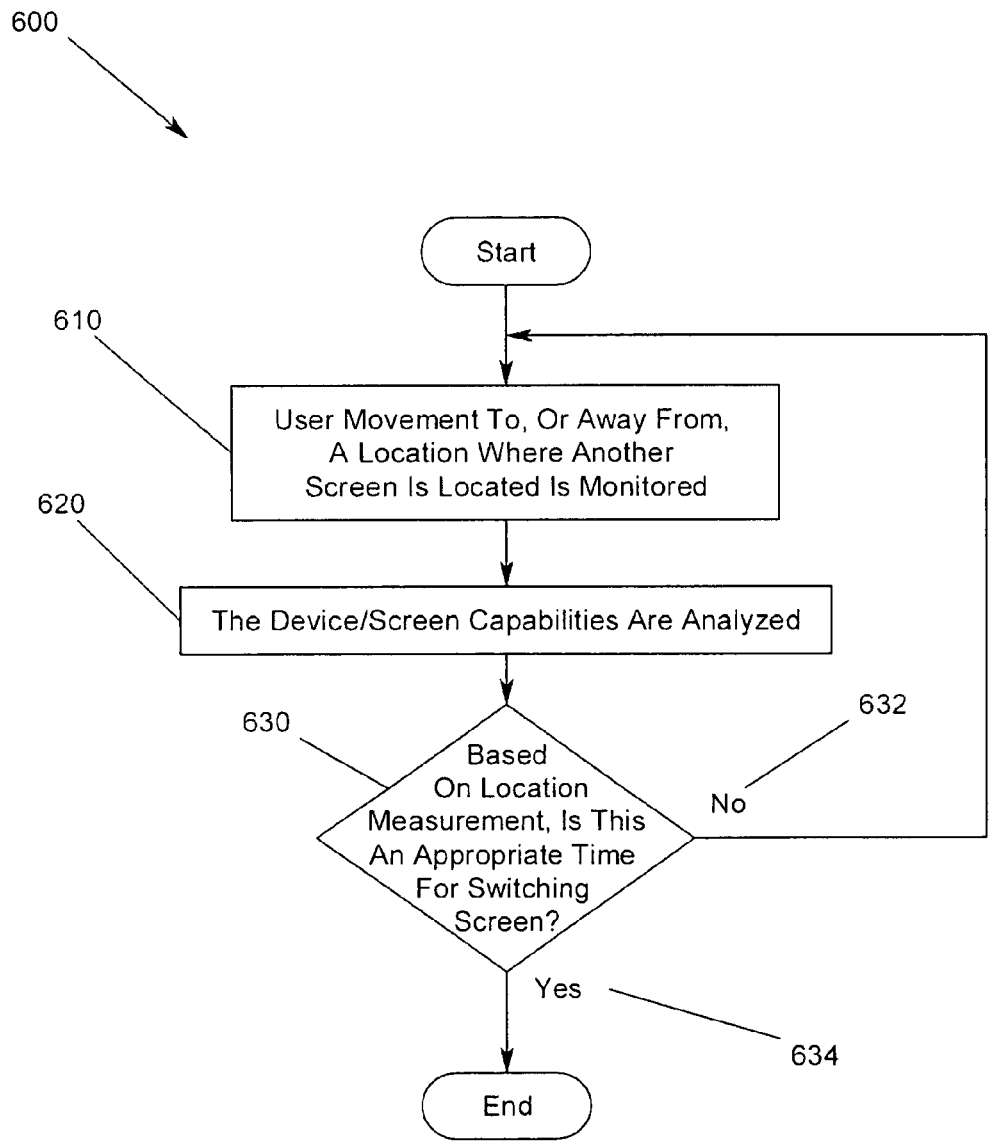
FIG. 6 is a flow chart illustrating the determination of when switching is appropriate according to an exemplary embodiment.

FIG. 6 is a flow chart 600 illustrating the processor controlled determination of when switching is appropriate according to an exemplary embodiment. User movement to, or away from, a location is monitored 610, e.g., home, office, lake cabin, hotel room, etc. For a mobile user, change in location may be used as a key indicator of a need to switch screens. The device/screen capabilities, such as features, size, etc. are also analyzed 620. Based on LBS (Location Based Service) location measurement, e.g., and the analyzed capabilities, a determination of when the switching is appropriate is made 630. If a switch is not now appropriated 632, the process returns to the beginning to continue to monitor the user 610. Otherwise 634, this portion of the process 600 is complete.

Figure 7:
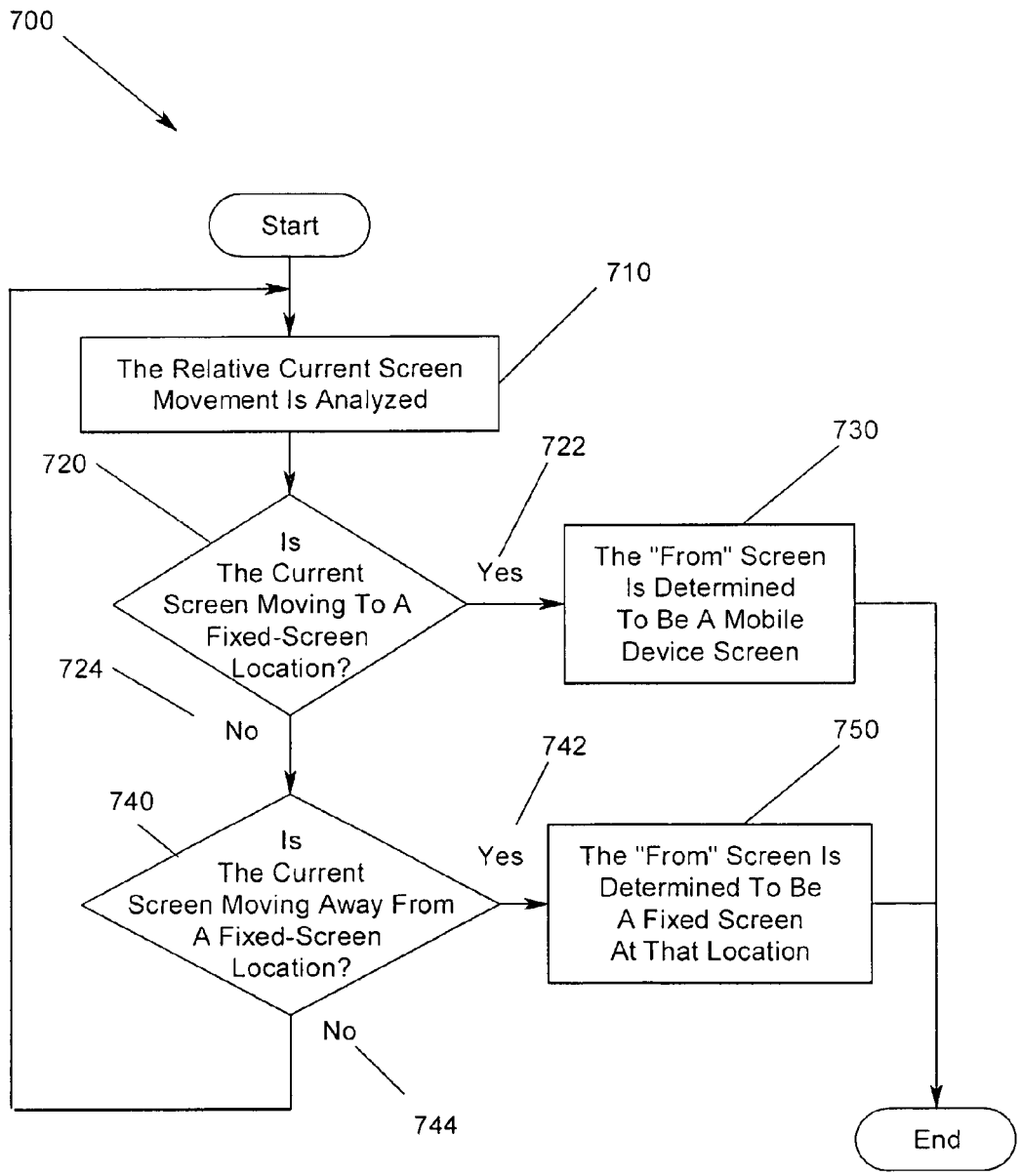
FIG. 7 is a flow chart illustrating the determination of a "from" screen according to an exemplary embodiment.

FIG. 7 is a flow chart 700 illustrating the processor controlled determination of a "from" screen according to an exemplary embodiment. In FIG. 7, the relative current screen movement is analyzed 710. A determination is made whether the current screen is moving to a fixed-screen location 720. When the current screen is moving to a fixed-screen location 722, the "from" screen is determined to be a mobile device screen 730.

When the current screen is not moving to a fixed-screen location 724, a determination is made whether the current screen is to be moving away from a fixed-screen location 740. When the current screen is moving away from a fixed-screen location 742, the "from" screen is determined to be a fixed screen at that location 750. Otherwise 744, the process 700 is complete.

Figure 8:
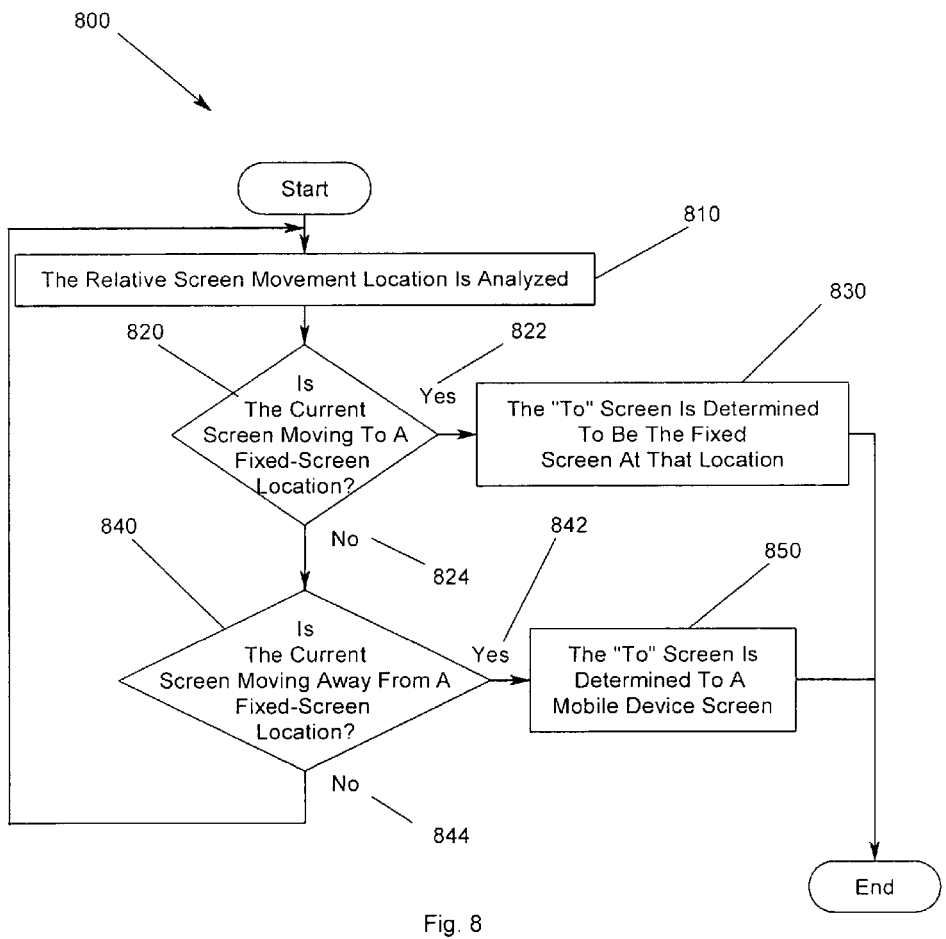
FIG. 8 is a flow chart illustrating the determination of a "to" screen according to an exemplary embodiment.

FIG. 8 is a flow chart 800 illustrating the processor controlled determination of a "to" screen according to an exemplary embodiment. In FIG. 8, the relative screen movement location is analyzed 810. A determination is made whether the current screen is moving to a fixed-screen location 820. When the current screen is moving to a fixed-screen location 822, the "to" screen is determined to be the fixed screen at that location 830. When the current screen is not moving to a fixed-screen location 824, a determination is made whether the current screen is moving away from a fixed-screen location 840. When the current screen is moving away from a fixed-screen location 842, the "to" screen is determined to a mobile device screen 850. Otherwise 844, the process 800 is complete.

Figure 9:
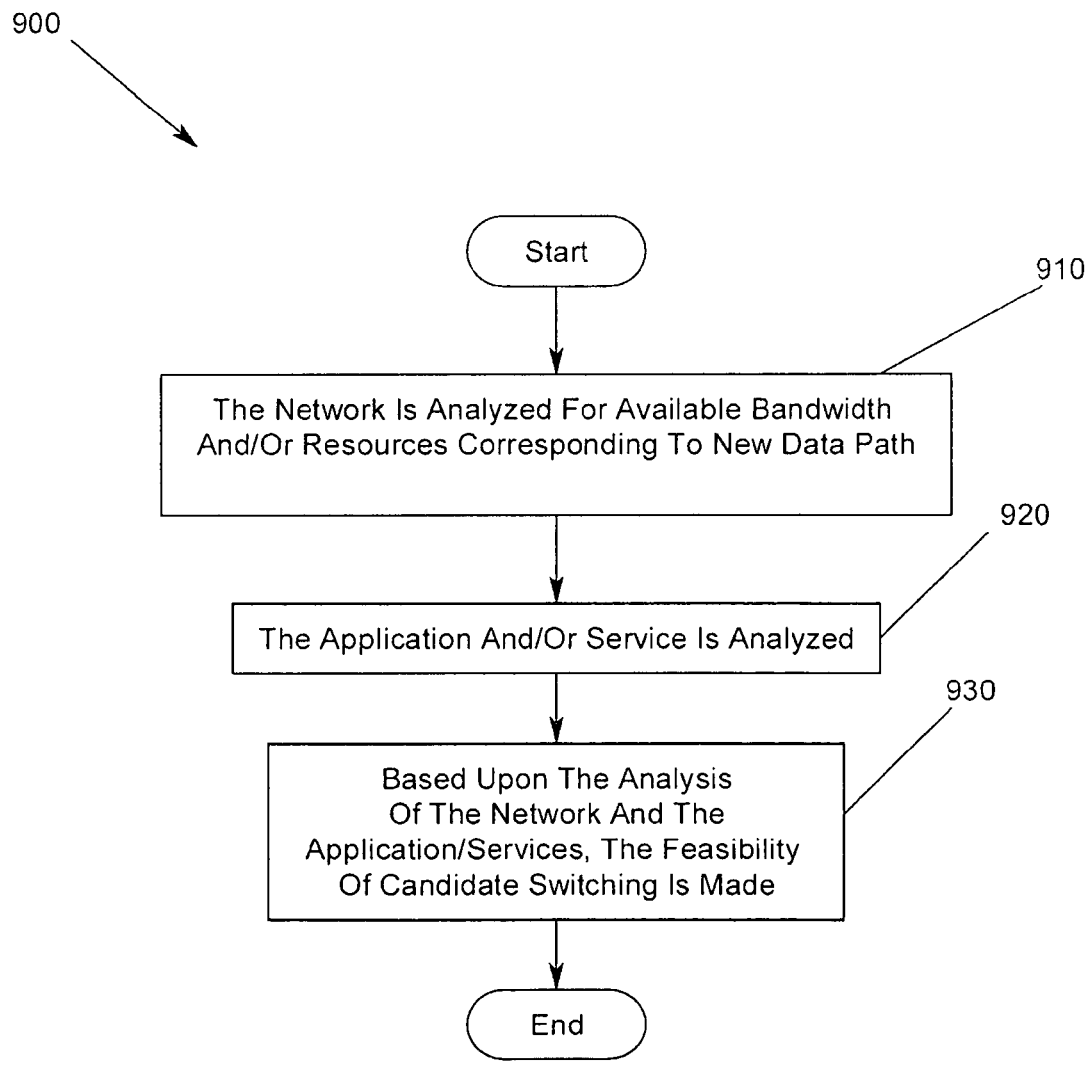
FIG. 9 is a flow chart illustrating the determination of the feasibility of candidate switching according to an exemplary embodiment.

FIG. 9 is a flow chart 900 illustrating the processor controlled determination of the feasibility of candidate switching according to an exemplary embodiment. In FIG. 9, the network is analyzed for available bandwidth and/or resources corresponding to new data path 910. The application and/or service is analyzed 920, e.g., for capability, authentication, authorization. Based upon the analysis of the network and the application/services, the feasibility of candidate switching is made 930.

Figure 10:
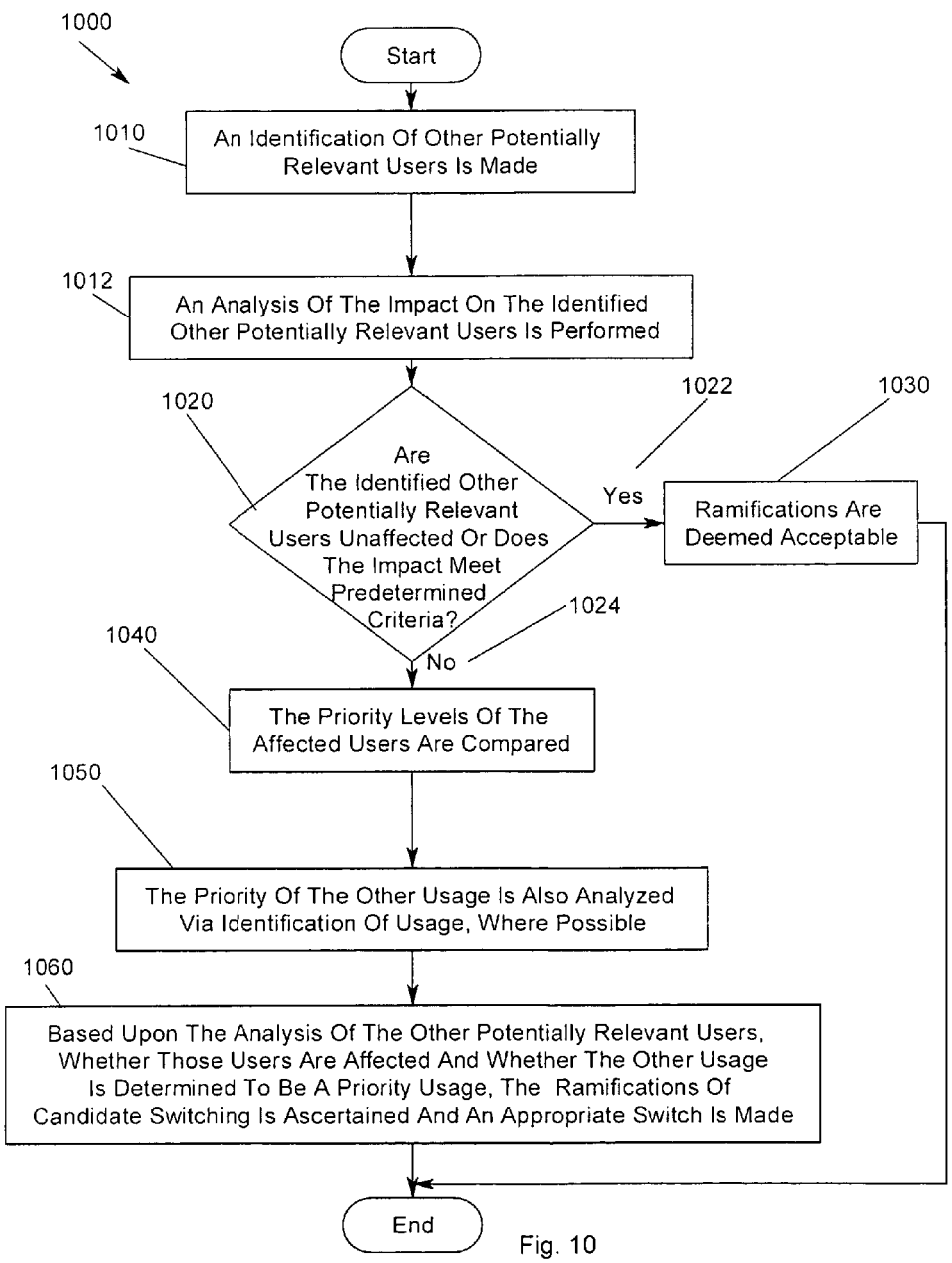
FIG. 10 is a flow chart illustrating the analysis of the ramifications of candidate switching according to an exemplary embodiment.

FIG. 10 is a flow chart 1000 illustrating the processor controlled analysis of the ramifications of candidate switching according to an exemplary embodiment. In FIG. 10, an identification of other potentially relevant users is made 1010. The identification of other potentially relevant users is made using the database, profile, and preferences that are stored. An analysis of the impact on the identified other potentially relevant users is performed 1012. The impact on other users may depend on what service other users are using, what device the other users are using, how much associated resources are the other users using, e.g., HDTV versus SDTV, and what is their priority.

A determination is made whether the identified other potentially relevant users are unaffected or whether the impact meets predetermined criteria 1020. When the identified other potentially relevant users are deemed unaffected or the impact meets predetermined criteria 1022, the ramifications are deemed acceptable 1030. When the identified other potentially relevant users are affected or the impact does not meet predetermined criteria 1024, the priority levels of the affected users are compared 1040. The characteristics of the other usage also influences the switching decisions, e.g., is there competing use, is the same content already being watched, is the appropriate device already on or does the device need to be turned on. The priority of the other usage is also analyzed 1050 via identification of usage, where possible, e.g., application/service being used, specific usage such as watching a particular television show, news program, or flipping channels, etc. The priority of other usage may also be determined via a database of usage history, e.g., random usage tends to indicate low priority, whereas religiously watching a particular show and never missing that show tends to indicate a high priority usage. Based upon the analysis of the other potentially relevant users, whether those users are affected and whether the other usage is determined to be a priority usage, the ramifications of candidate switching is ascertained 1060.

Figure 11:
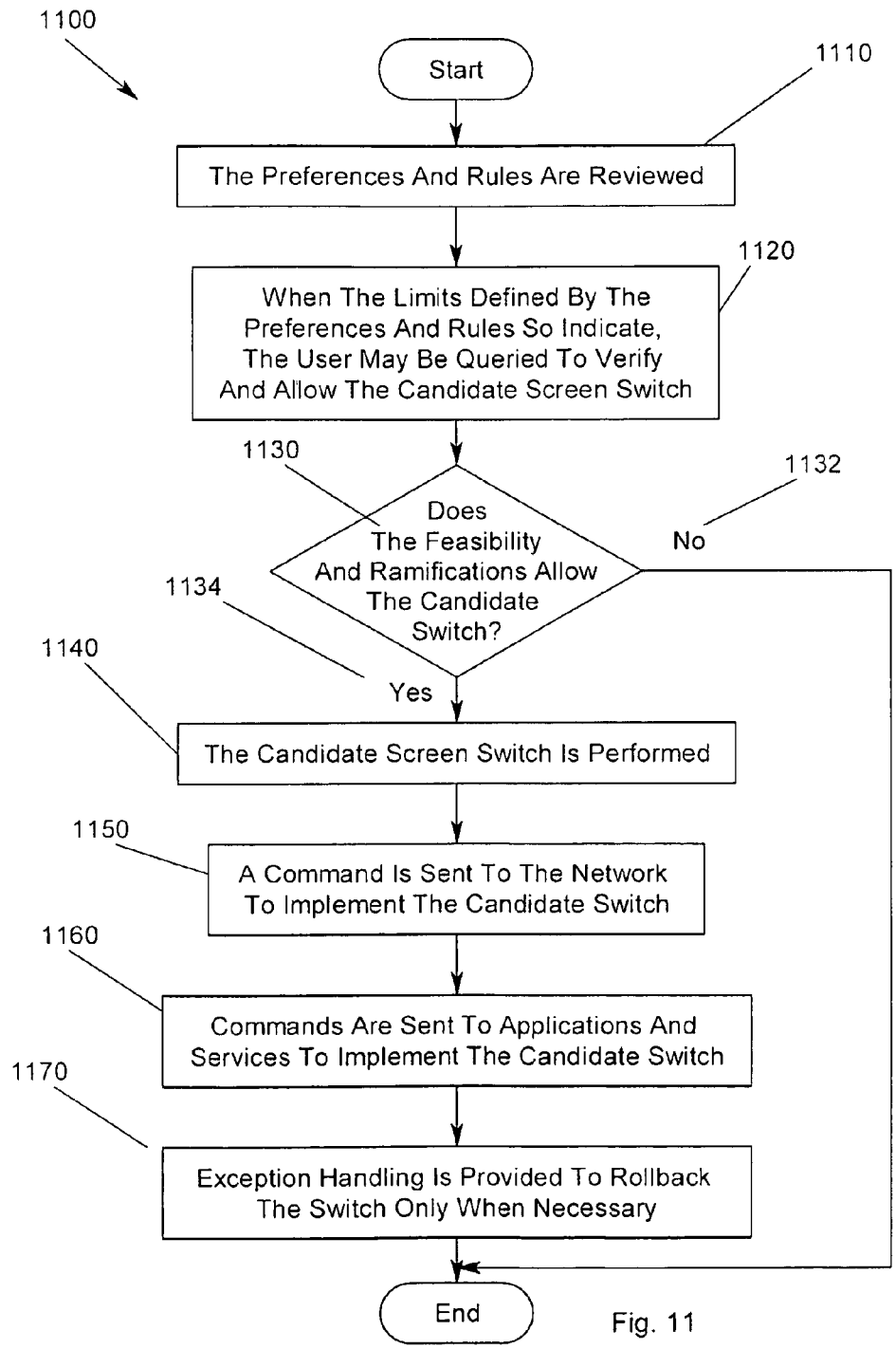
FIG. 11 is a flow chart showing the implementation of the candidate switching according to an exemplary embodiment.

FIG. 11 is a flow chart 1100 showing the processor controlled implementation of the candidate switching according to an exemplary embodiment. In FIG. 11, the preferences and rules are reviewed 1110. When the limits defined by the preferences and rules so indicate, the user may be queried to verify and allow the candidate screen switch 1120. A determination is made whether the feasibility and ramifications allow the candidate switch 1130. When the feasibility and ramifications allow the candidate switch 1134, the candidate screen switch is performed 1140. If not 1132, the process 1100 is complete. After the candidate screen switch is performed 1140, a command is sent to the network, and/or to associated equipment such as routers, switches, firewalls, gateways border controllers, etc., to implement the candidate switch 1150. Commands are sent to applications and service, and/or to associated equipment such as servers, proxies, databases, etc., to implement the candidate switch 1160. Exception handling is provided to rollback the switch only when necessary 1170. Errors may be detected. Moreover, user exception triggers, undo commands or go back commands may be issued automatically and/or by the user to indicate a desire to revert to the last working situation.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A device comprising:
  a controller; and
  memory for storing collected network data, the memory comprising executable instructions that when executed by the controller cause the controller to effectuate operations comprising:
    analyzing the collected network data;
    monitoring a location of a mobile device, to or from which a presentation of content is to be switched, within a communications network;
    detecting a change in the monitored location of the mobile device;

responsive to detecting the change in the monitored location of the mobile device:
  determining a relative direction of motion of the mobile device relative to another device;
  based on the determined relative direction of motion of the mobile device, determining an appropriate time for switching the presentation of content;
  identifying others that will be impacted by switching the presentation of content;
  determining an impact on the others of the switching of the presentation of the content;
  determining a ramification on the others of the switching of the presentation of the content;
  identifying a change in a system state within the communications network;
  determining active services other than the current active service being provided to the user that may be impacted by the determined switch;
  determining network capacity and utilization;
  based on the determined relative direction of motion, the determined appropriate time, the collected network data, the determined impact, the determined ramification, the identified change in a system state, the determined active services that may be impacted, and the determined network capacity and utilization, determining whether to perform a switch of the presentation of the content from a first media presentation screen on the mobile device to a second media presentation screen on the other device, or from the second media presentation screen on the other device to the first media presentation screen on the mobile device; and
  performing the determined switch of the presentation of the content to or from the first media presentation screen on the mobile device.

2. The device of claim 1, wherein the controller includes a policy decision module configured to make decisions based on the identified change in the system state.

3. The device of claim 1, the operations further comprising: analyzing whether the determined switch is feasible; and evaluating ramifications of the determined switch.

4. The device of claim 1, the operations further comprising performing at least one of determining a current active service being provided to a user, determining profiles and usage histories of the user involved with the determined switch, determining the active services of other users, determining profiles and usage histories of the other users, or determining policy rules, algorithms, parameters, and thresholds.

5. The device of claim 1, the operations further comprising preparing the first media presentation screen or the second media presentation screen for viewing by a user based upon analysis of the collected data.

6. The device of claim 1, the operations further comprising identifying a state of the communications network, a state of a service provided to a user, and a state of a customer based upon an analysis of the collected data.

7. The device of claim 1, wherein the collected data includes parameters set by a user.

8. The device of claim 1, the operations further comprising determining that the first media presentation screen or the second media presentation screen is appropriate for the switch based upon the determined change in the monitored location of the mobile device and an analysis of the collected data and communicate control information within the network.

9. The device of claim 1, the operations further comprising identifying the second media presentation screen as a fixed screen at a fixed-screen location when the mobile device is determined to be moving away from the fixed-screen location and identify the first media presentation screen to be a display on the mobile device, and wherein the controller is further configured to identify the first media presentation screen as the display on the mobile device when the mobile device is determined to be moving toward the fixed-screen location and identify the second media presentation screen as the fixed screen.

10. A computer-readable medium, wherein the computer readable medium is not a transient signal, the computer-readable medium having computer-executable instructions that when executed by a processor cause the processor to effectuate operations comprising:
  storing collected network data;
  analyzing the collected network data;
  monitoring a location of a mobile device, to or from which a presentation of content is to be switched, within a communications network;
  detecting a change in the monitored location of the mobile device;
  responsive to detecting the change in the monitored location of the mobile device:
    determining a relative direction of motion of the mobile device relative to another device;
    based on the determined relative direction of motion of the mobile device, determining an appropriate time for switching the presentation of content;
    identifying others that will be impacted by switching the presentation of content;
    determining an impact on the others of the switching of the presentation of the content;
    determining a ramification on the others of the switching of the presentation of the content;
    identifying a change in a system state within the communications network;
    determining active services other than the current active service being provided to the user that may be impacted by the determined switch;
    determining network capacity and utilization;
  based on the determined relative direction of motion, the determined appropriate time, the collected network data, the determined impact, the determined ramification, the identified change in a system state, the determined active services that may be impacted, and the determined network capacity and utilization, determining whether to perform a switch of the presentation of the content from a first media presentation screen on the mobile device to a second media presentation screen on the other device, or from the second media presentation screen on the other device to the first media presentation screen on the mobile device; and
  performing the determined switch of the presentation of the content to or from the first media presentation screen on the mobile device.

11. The computer-readable medium of claim 10, the operations further comprising identifying parameters set by a user by analyzing the collected data.

12. The computer-readable medium of claim 10, the operations further comprising performing at least one of the following: determine a current active service being provided to a user, determine profiles and usage histories of the user associated with the determined switch, determine the active services of other users, determine profiles and usage histories of the other users, or determine policy rules, algorithms, parameters, and thresholds.

13. The computer-readable medium of claim 10, the operations further comprising:
analyzing whether the determined switch is feasible; and
evaluating ramifications of the determined switch.

14. The computer-readable medium of claim 10, the operations further comprising identifying the second media presentation screen as a fixed screen at a fixed-screen location and identify the second media presentation screen as a display on the mobile device when the mobile device is determined to be moving away from the fixed-screen location, and identify the first media presentation screen as the display on the mobile device and identify the second media presentation screen as the fixed screen when the mobile device is determined to be moving toward the fixed-screen location.

15. The computer-readable medium of claim 10, the operations further comprising determining that the second media presentation screen is appropriate for the switch based upon the determined change in the monitored location of the mobile device and the analysis of collected data and communicating control information within the communications network.

16. A method comprising:
storing collected network data;
analyzing the collected network data;
monitoring a location of a mobile device, to or from which a presentation of content is to be switched, within a communications network;
detecting a change in the monitored location of the mobile device; and
responsive to detecting the change in the monitored location of the mobile device:
determining a relative direction of motion of the mobile device relative to another device;
based on the determined relative direction of motion of the mobile device, determining an appropriate time for switching the presentation of content;
identifying others that will be impacted by switching the presentation of content;
determining an impact on the others of the switching of the presentation of the content;
determining a ramification on the others of the switching of the presentation of the content;
identifying a change in a system state within the communications network;
determining active services other than the current active service being provided to the user that may be impacted by the determined switch;
determining network capacity and utilization;
based on the determined relative direction of motion, the determined appropriate time, and the collected network data, the determined impact, the determined ramification, the identified change in a system state, the determined active services that may be impacted, and the determined network capacity and utilization, determining whether to perform a switch of the presentation of the content from a first media presentation screen on the mobile device to a second media presentation screen on the other device, or from the second media presentation screen on the other device to the first media presentation screen on the mobile device; and
performing the determined switch of the presentation of the content to or from the first media presentation screen on the mobile device.

\* \* \* \* \*